(12) United States Patent  
Lai

(10) Patent No.: US 6,694,280 B2
(45) Date of Patent: Feb. 17, 2004

(54) METHOD FOR OVERFLOW TESTING OF A BLIND EQUALIZER

(75) Inventor: Jyh-Ting Lai, Hsinchu (TW)

(73) Assignee: Faraday Technology Corporation, Hsinchu (TW)

( * ) Notice: Subject to any disclaimer, the term of this patent is extended or adjusted under 35 U.S.C. 154(b) by 118 days.

(21) Appl. No.: 10/114,982

(22) Filed: Apr. 4, 2002

(65) Prior Publication Data
US 2003/0191601 A1 Oct. 9, 2003

(51) Int. Cl.$^7$ .............................. G01R 31/00; H03H 7/30
(52) U.S. Cl. ........................ 702/117; 375/324; 375/399; 375/347; 702/196
(58) Field of Search .................................. 702/108, 117, 702/196; 342/378; 375/208, 222, 229, 233, 244, 246, 247, 254, 324, 347; 370/329, 334

(56) References Cited

U.S. PATENT DOCUMENTS

| 5,299,148 A | * | 3/1994 | Gardner et al. ............. 702/196 |
| 5,432,818 A | * | 7/1995 | Lou ............................ 375/324 |
| 6,047,023 A | * | 4/2000 | Arnstein ..................... 375/229 |
| 6,560,299 B1 | * | 5/2003 | Strolle et al. ............... 375/347 |

OTHER PUBLICATIONS

US 2003/0107986 A1, PubDate: Jun. 12, 2003, FiledDate: Dec. 11, 2001, Malkemes et al., "Method and apparatus for demodulating orthogonal frequency division multiplexed signals".*

* cited by examiner

Primary Examiner—John Barlow
Assistant Examiner—John Le
(74) Attorney, Agent, or Firm—Rabin & Berdo, P.C.

(57) ABSTRACT

A method for overflow testing of a blind equalizer. The method uses the following steps; providing a primary located signal in a primary signaling point of a period by a signal generating loop; multiplying the primary located signal by a set of continuously decreasing signals to get a primary signal; providing a interfering located signal in a plurality of interfering signaling points of the period by a ISI generating loop, wherein the interfering signaling points are different from the primary signaling point; multiplying the interfering located signal by a set of continuously increasing/decreasing signals to get an interference signal; adding the primary signal and the interference signal to get the input signal; inputting the input signal to the blind equalizer to adapt the input signal, wherein the tap weights corresponding to the interference signal in a blind equalizer overflow.

8 Claims, 6 Drawing Sheets under # US 6,694,280 B2

METHOD FOR OVERFLOW TESTING OF A BLIND EQUALIZER

BACKGROUND OF THE INVENTION

1. Field of the Invention

The present invention relates in general to a method for overflow testing of a blind equalizer. In particular, the present invention relates to a method to perform an overflow test of a blind equalizer without adding additional circuits.

2. Description of the Related Art

Proper detection of a signal is hampered by various sources of signal degradation. One such source is intersymbol interference where consecutive transmitted symbols interfere with each other. Other sources of signal degradation include the transmission media (i.e. wire) and analog filters. These factors produce large amplitude and group delay distortion in the signal that needs compensation.

To compensate for intersymbol interference (ISI) and other sources of signal degradation and distortion, best performance is achieved by implementing an equalizer as an adaptive filter. An adaptive filter can modify from time instant to time instant, the coefficients, also referred to as tap weights, used in the filter to remove ISI and to compensate for amplitude and group delay distortions. The update of the tap weights is done to minimize the error at the output of the filter. This error is effectively a measure of the difference between the actual output of the filter and the expected output. The adaptive process continues until the error is at a minimum (i.e. the filter converges).

The convergence of an equalizer depends on many factors including initial tap weights, desired convergence rate, signal to noise ratio (SNR) at the input and phase changes caused by a clock recovery circuit at the receiver, and can be accomplished with various adaptive algorithms.

The adaptation of the tap weights in adaptive equalizers is based on an assumed correct decision about which symbol was received. This assumption is valid for equalizers with a training sequence for which the received symbol is in fact known in advance. Equalizers, however, are also used without the benefit of a training sequence, in which case the decision is not necessarily correct. These equalizers are referred to as blind equalizers. The term blind refers to trying to find the correct equalizer coefficients without a reference training sequence, therefore during convergence the decisions may be incorrect and the coefficients (weights) erroneously updated. Although the possibility of a mistake exists, if the blind equalizer makes correct decisions for a sufficiently large set of received symbols, the equalizer will converge correctly.

FIG. 1 is a block diagram illustrating a blind equalizer in the prior art. A blind equalizer 100 is a transversal finite impulse response filter (FIR). A set of continuous information $X_1(n), X_2(n), \ldots, X_M(n)$ input to the blind equalizer 100. The set of continuous information convolute a set of tap weights $W_1, W_2, \ldots, W_M$ in the blind equalizer 100 to produce an output of the blind equalizer $r_f(n)$.

The blind equalizer 100 adapts the tap weights to compensate for intersymbol interference (ISI) and other sources of signal degradation and distortion. The output of the blind equalizer $r_f(n)$ inputs to a slicer 102. Then, the slicer produces an output of the slicer $r_O(n)$. An error $e(n)$ defines a measure of the difference between the output of the slicer $r_O(n)$ and the output of the blind equalizer $r_f(n)$. Thus, $e(n)=r_O(n)-r_f(n)$. Then, the error $e(n)$ is fed back to the blind equalizer 100 to adapt the tap weights.

The blind equalizer, as shown in FIG. 1, uses the output of the slicer $r_O(n)$ as a training sequence $d(n)$. After completing the adaptation, the output of the blind equalizer $r_f(n)$ almost equals to the training sequence $d(n)$. In other equalizers, the training sequence $d(n)$ is provided from the outside device, not from the output of the slicer $r_O(n)$. Therefore, after inputting a training sequence with high power from the outside device, the output of the equalize will rapidly increase and tap weights will overflow. On the contrary, for a blind equalizer, because the training sequence $d(n)$ is provided from the output of the slicer $r_O(n)$, it is impossible to provide a training sequence with high power to make the blind equalizer overflow. Therefore, in order to perform overflow test of a blind equalizer, additional circuits must be added. It is not economical to add additional circuits to perform an overflow test of a blind equalizer. In addition, in the prior art, a special tap weight to perform an overflow test can be designed.

SUMMARY OF THE INVENTION

An object of the present invention is to provide a method to perform an overflow test of a blind equalizer without adding additional circuits and to designate special tap weights of the blind equalizer to overflow.

Another object of the present invention is to make it possible to designate special tap weights of the blind equalizer to overflow.

To realize the above objects, the invention provides a method for overflow testing of a blind equalizer where a blind equalizer adapts an input signal by adjusting a plurality of tap weights in the blind equalizer. The method comprises the following steps: providing a primary located signal in a primary signaling point of a period by a signal generating loop; multiplying the primary located signal by a set of continuously decreasing signals to get a primary signal; providing an interfering located signal in a plurality of interfering signaling points of the period by a ISI generating loop, wherein the interfering signaling points are different from the primary signaling point; multiplying the interfering located signal by a set of continuous signals to get an interference signal; adding the primary signal and the interference signal to get the input signal; and inputting the input signal to the blind equalizer to adapt the input signal, wherein the tap weights corresponding to the interference signal in the blind equalizer overflow. An initial status of the ISI generating loop is determined by a slicing level of a slicer, amplitudes of the primary signal after the blind equalizer are larger than the slicing level and amplitudes of the interference signal after the bind equalizer are smaller than the slicing level. The primary signaling point and the interfering signaling points are chosen to decide the tap weights, which will overflow in the blind equalizer.

Furthermore, a slope formed by amplitudes of the interference signals is an interfering slope. The blind equalizer further comprises a learning constant which is bigger than the modulus of the interfering slope. A slope formed by the amplitudes of the primary signal is a primary slope. The absolute value of modulus of the primary slope is smaller than the learning constant. The blind equalizr further comprises a plurality of registers and the interval between two signals of the continuous signals and the continuously decreasing signals are bigger than the number of the registers.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE PREFERRED EMBODIMENT

Figure 1:
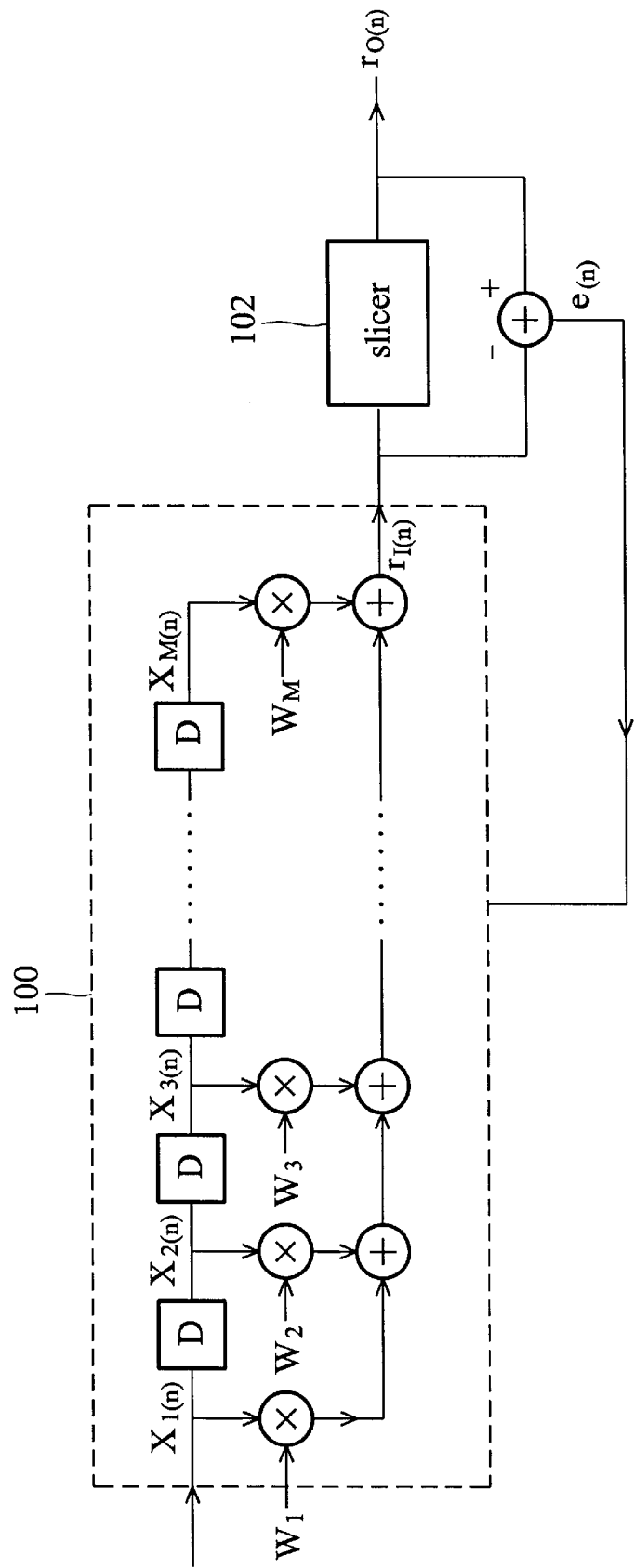
FIG. 1 is a block diagram illustrating a blind equalizer in the prior art.
Figure 2:
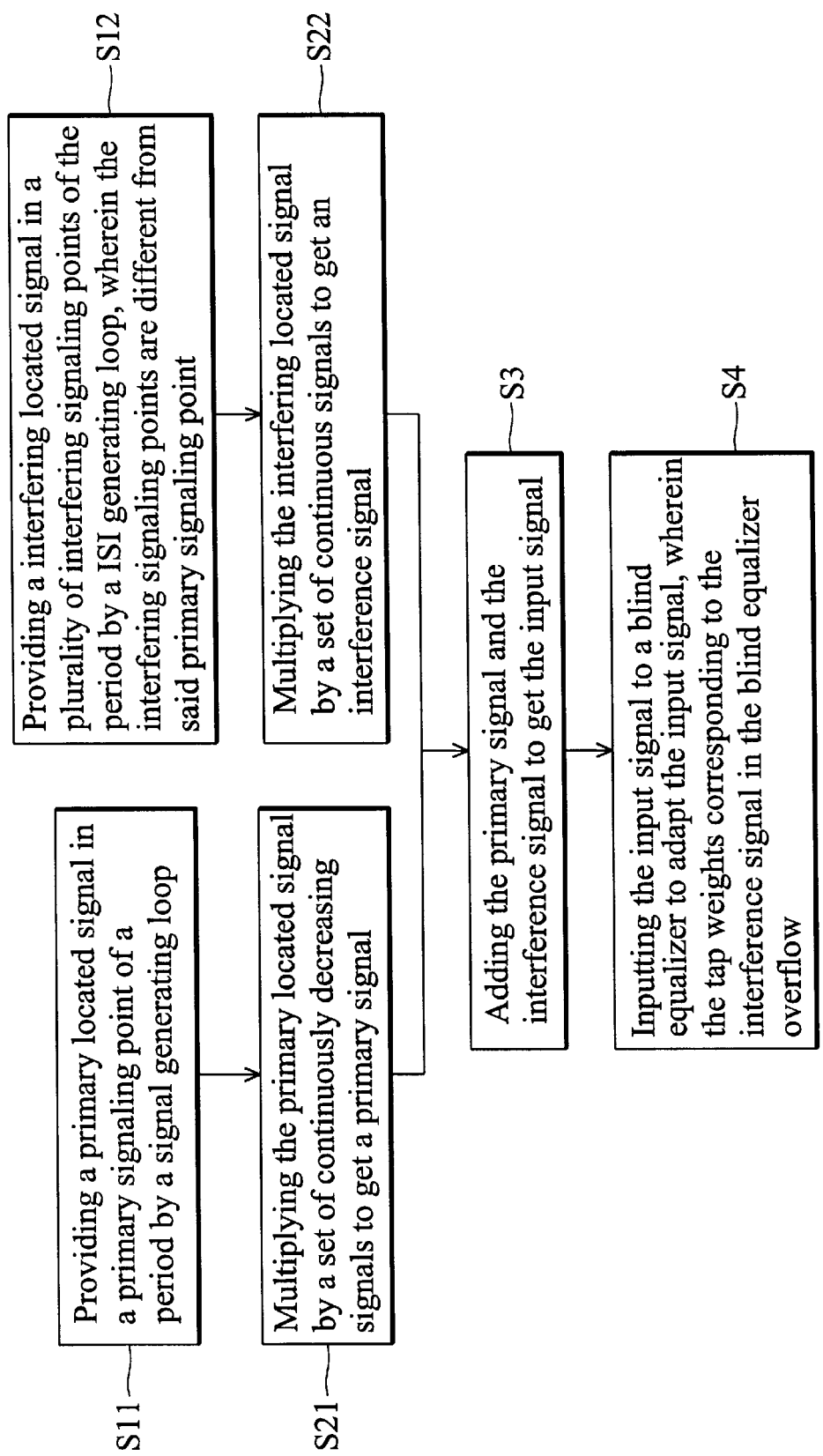
FIG. 2 is a flow chart illustrating the method for overflow testing of a blind equalizer in the embodiment of the invention.

FIG. 2 is a flow chart illustrating the method for overflow testing of a blind equalizer in the embodiment of the invention. As shown in FIG. 2, first, a primary located signal in a primary signaling point of a period is provided by a signal generating loop (S11). Then, the primary located signal is multiplied by a set of continuously decreasing signals to get a primary signal (s21). Although the primary signal is a set of continuously decreasing signals, amplitudes of the primary signal after a blind equalizer must be larger than a slicing level.

In addation, an interfering located signal in a plurality of interfering signaling points of the period is provided by a ISI generating loop, wherein the interfering signaling points are different from said primary signaling point (s12). Then, the interfering located signal is multiplied by a set of continuous signals to get an interference signal (s22). The set of continuous signals may be a set of continuously decreasing signals or a set of continuously increasing signals. In this embodiment, the set of continuously increasing signal is used as example. As well, an initial status of the ISI generating loop is determined by the slicing level of the slicer, and amplitudes of the interference signal after the bind equalizer must be smaller than the slicing level.

Then, the primary signal and the interference signal are added to get the input signal (s3). The interference signal composes a plurality of precursor interfering located signal and a plurality of postcursor interfering located signal. Finally, the input signal is inputted to the blind equalizer to adapt the input signal, wherein the tap weights corresponding to the interference signal in the blind equalizer overflow (s4). The step comprises two parts. For the primary signal, since the primary signal is a set of continuously decreasing signals and the input signal comprises the primary signal, to make amplitude of the primary signal after the blind equalizer bigger than the slicing level, the tap weight corresponding to the primary signal in the blind equalizer gradually increases and finally overflows. For the interference signal, since the primary signal is the set of continuously decreasing signals, to make amplitudes of the interference signal after the bind equalizer smaller than the slicing level, the tap weights corresponding to the interference signal in the blind equalizer gradually increase and finally overflow.

Figure 3:
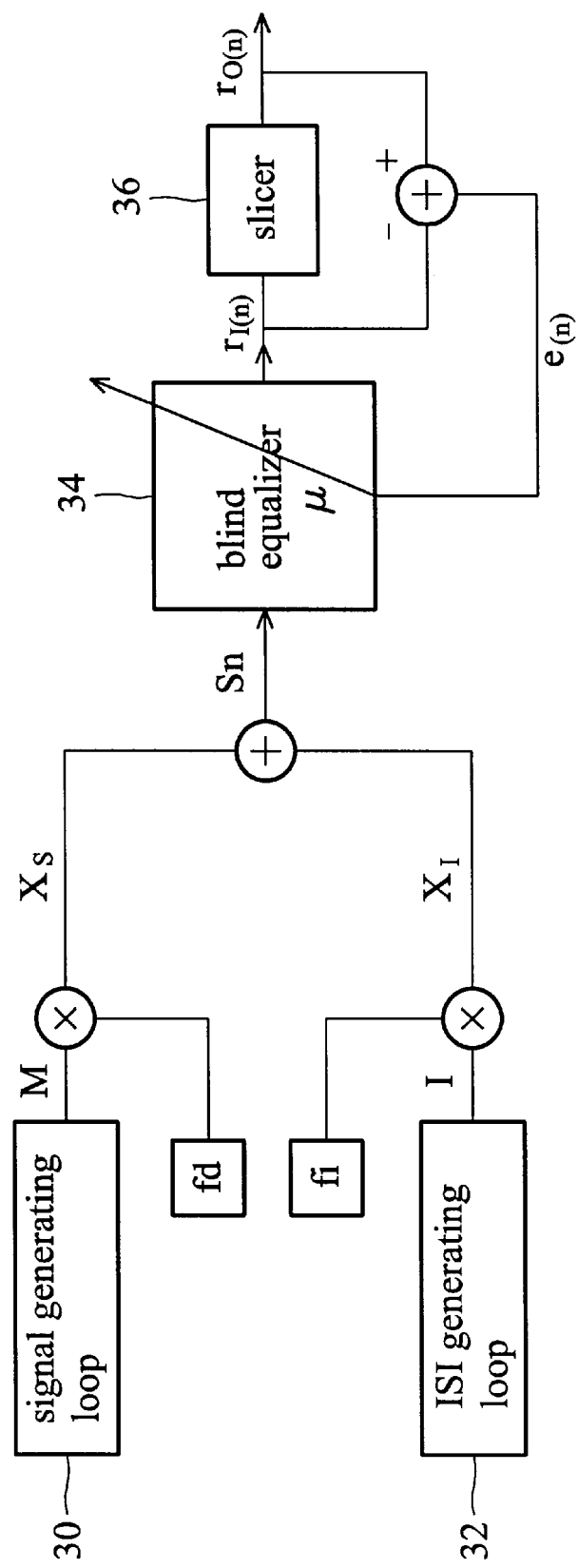
FIG. 3 is a block diagram illustrating a structure to achieve the method in the embodiment of the invention.
Figure 4:
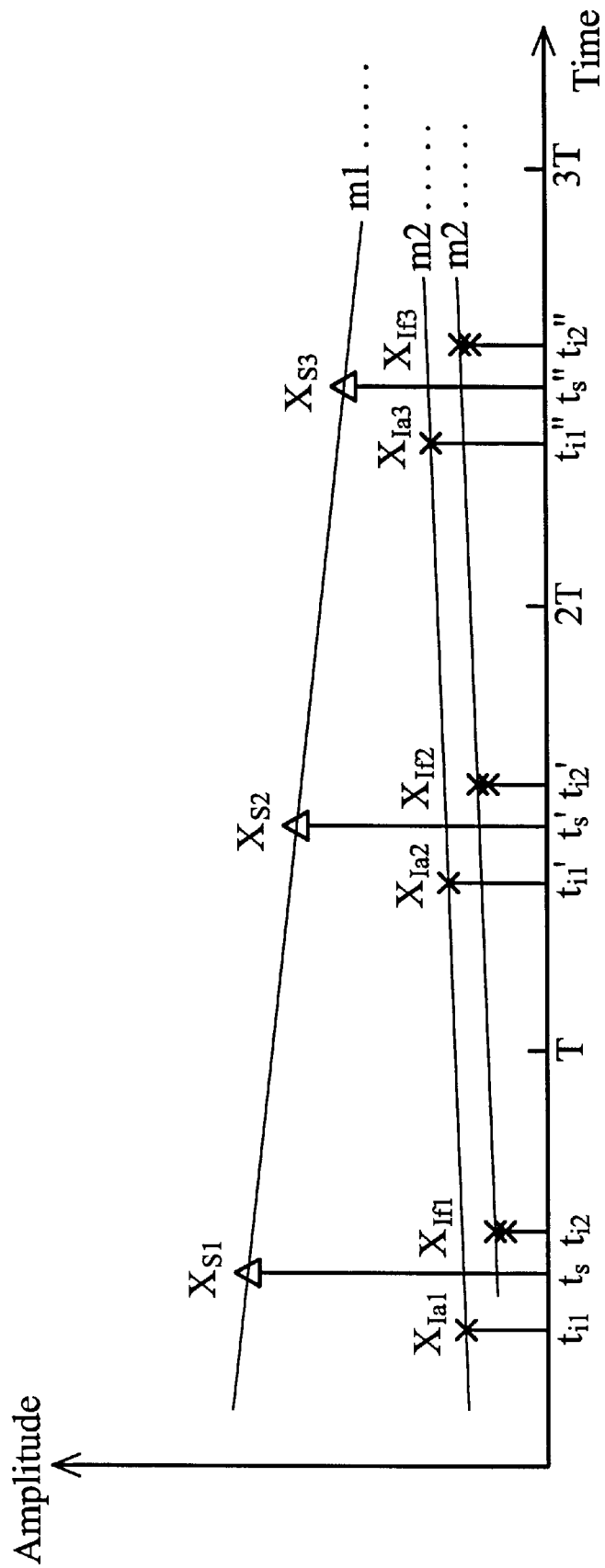
FIG. 4 is a schematic diagram illustrating one example of the input signal in FIG. 3.

As shown in FIG. 3, a signal generating loop 30 produces a primary located signal M in a primary signaling point $t_s$ of a period T (see to FIG. 4). An ISI generating loop 32 produces a interfering located signal I in interfering signaling points $t_{i1}$ and $t_{i2}$ (see to FIG. 4). The primary located signal M is multiplied by a set of continuously decreasing signals fd to get a primary signal $X_S$. Amplitudes of the primary signal $X_S$ after a blind equalizer 34 are larger than a slicing level of a slicer 36 (see to FIG. 6). The interfering located signal I is multiplied by a set of continuously increasing signals fi to get an interference signal $X_I$. Amplitudes of the interference signal $X_I$ after the bind equalizer 34 are smaller than the slicing level (see to FIG. 6). Then, the primary signal $X_S$ and the interference signal $X_I$ are added to get an input signal Sn. The input signal Sn is inputted to the blind equalizer 34 to adapt the input signal Sn, wherein the blind equalizer 34 adjusts a plurality of tap weights in the blind equalizer 34 (see to FIG. 6).

FIG. 4 is a schematic diagram illustrating the input signal in FIG. 3. The cross axis represents time. The vertical axis represents the amplitudes of the input signal Sn. The input signal Sn comprises $X_{S1}$, $X_{S2}$ and $X_{S3}$ which belong to the primary signal $X_s$ and $X_{Ia1}$, $X_{Ia2}$, $X_{Ia3}$, $X_{If1}$, $X_{If2}$ and $X_{If3}$ which belong to the interference signal $X_i$.

The primary signal Sn (comprises $X_{s1}$, $X_{s2}$ and $X_{s3}$) is a set of continuously decreasing signals and only appears in the primary signaling point of every period T. As shown in FIG. 4, in the period 0~T, the primary signal $X_{S1}$ appears in the signaling point $t_s$. In the period T~2T, the primary signal $X_{S2}$ appears in the signaling point $t'_s$. In the period 2T~3T, the primary signal $X_{S3}$ appears in the signaling point $t''_s$. The interference signal $X_I$ (comprises $X_{Ia1}$, $X_{Ia2}$, $X_{Ia3}$, $X_{If1}$, $X_{If2}$ and $X_{If3}$) is a set of continuously increasing signals and only appears in the interfering signaling points of every period T. In the period 0~T, the interference signal $X_{Ia1}$ and $X_{If1}$ respectively appear in the interfering signaling points $t_{i1}$ and $t_{i2}$. Because the interfering signaling points $t_{i1}$ appears before the signaling point $t_s$, the interference signal $X_{Ia1}$ is a precursor interfering located signal. Because of the interfering signaling points $t_{i2}$ after the signaling point $t_s$, the interference signal $X_{If1}$ is a postcursor interfering located signal. In the period T~2T, the interference signal $X_{Ia2}$ and $X_{If2}$ respectively appear in the interfering signaling points $t'_{i1}$ and $t'_{i2}$. Because the interfering signaling point $t'_{i1}$ appears before the signaling point $t'_s$, the interference signal $X_{Ia2}$ is a precursor interfering located signal. Because the interfering signaling point $t'_{i2}$ appears after the signaling point $t'_s$, the interference signal $X_{If2}$ is a postcursor interfering located signal. In the period T~3T, the interference signal $X_{Ia3}$ and $X_{If3}$ respectively in the interfering signaling points $t''_{i1}$ and $t''_{i2}$. Because the interfering signaling points $t''_{i1}$ appears before the signaling point $t''_s$, the interference signal $X_{Ia3}$ is a precursor interfering located signal. Because the interfering signaling points $t''_{i2}$ appears after the signaling point $t''_s$, the interference signal $X_{If3}$ is a postcursor interfering located signal.

As shown in FIG. 4, a slope formed by the amplitudes of the primary signal $X_{S1}$, $X_{S2}$ and $X_{S3}$ is a primary slope m1. A slope formed by amplitudes of the interference signals $X_{Ia1}$, $X_{Ia2}$ and $X_{Ia3}$ is an interfering slope m2. A slope formed by amplitudes of the interference signals $X_{If1}$, $X_{If2}$ and $X_{If3}$ is also the interfering slope m2. The blind equalize 34 comprises a learning constant $\mu$. The absolute value of modulus of the primary slope m1 and the interfering slope m2 must be smaller than the learning constant $\mu$.

Figure 5:
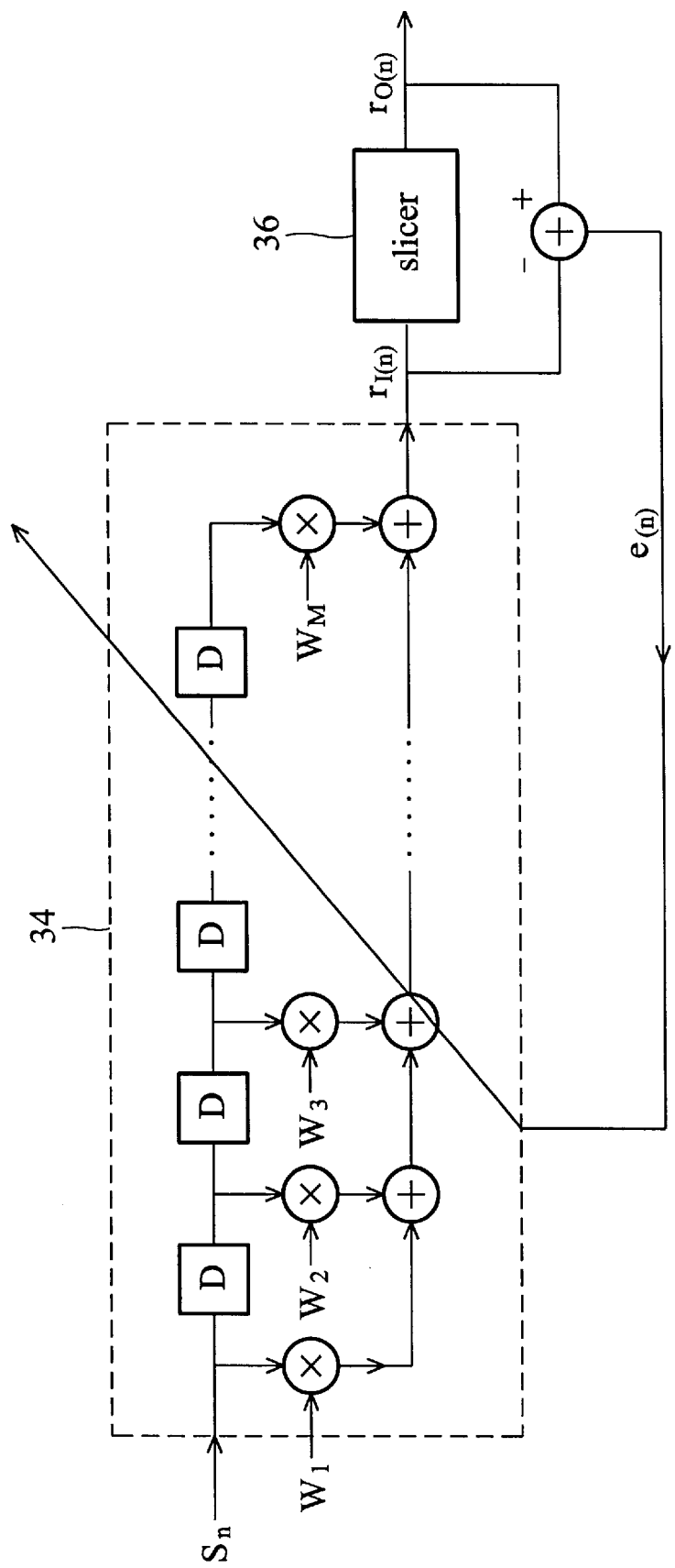
FIG. 5 is a block diagram illustrating the blind equalizer in FIG. 3.

FIG. 5 is a block diagram illustrating the blind equalizer in FIG. 3. The input signal Sn inputs to the blind equalizer 34. The input signal Sn is convoluted with a set of tap weights $W_1$, $W_2$, ..., $W_M$ in the blind equalizer 34 to produce an output of the blind equalizer $r_f(n)$. The blind equalize 34 comprises a plurality of registers D. The interval between two signals of the continuously decreasing signals fd and the continuously increasing signals fi are bigger than the number of the registers M. Therefore, within a period T, there is one primary signal $X_S$.

The output of the blind equalizer $r_f(n)$ inputs to a slicer 36. Then, the slicer 36 produces an output of the slicer $r_O(n)$. An error e(n) defines a measure of the difference between the output of the slicer $r_O(n)$ and the output of the blind equalizer $r_f(n)$. It means $e(n)=r_O(n)-r_f(n)$. Then, the error e(n) is fed back to the blind equalizer 34 to adapt the tap weights. There are many adaptive algorithms used in the blind equalizer to adapt the input signal such as Least-Mean-Square, Recursive Least Square and other adaptive ways. In this embodiment of the invention, Least-Mean-Square (LMS) is used to adapt the tap weights as example. The adaptive algorithm is:

$$W(n+1)=W(n)+\mu*e(n)*X(n)$$

where W(n+1) is the vector set formed by the tap weights $W_1, W_2, \ldots, W_M$ in the blind equalizer 34 after a while, i.e. the vector set formed by the adjusted tap weights;

W(n) is the vector set formed by the tap weights $W_1, W_2, \ldots, W_M$ in the blind equalizer 34;

X(n) is data input signal Sn to the blind equalizer 34 in the period T;

$\mu$ is the learning constant; and e(n) is the error.

Figure 6:
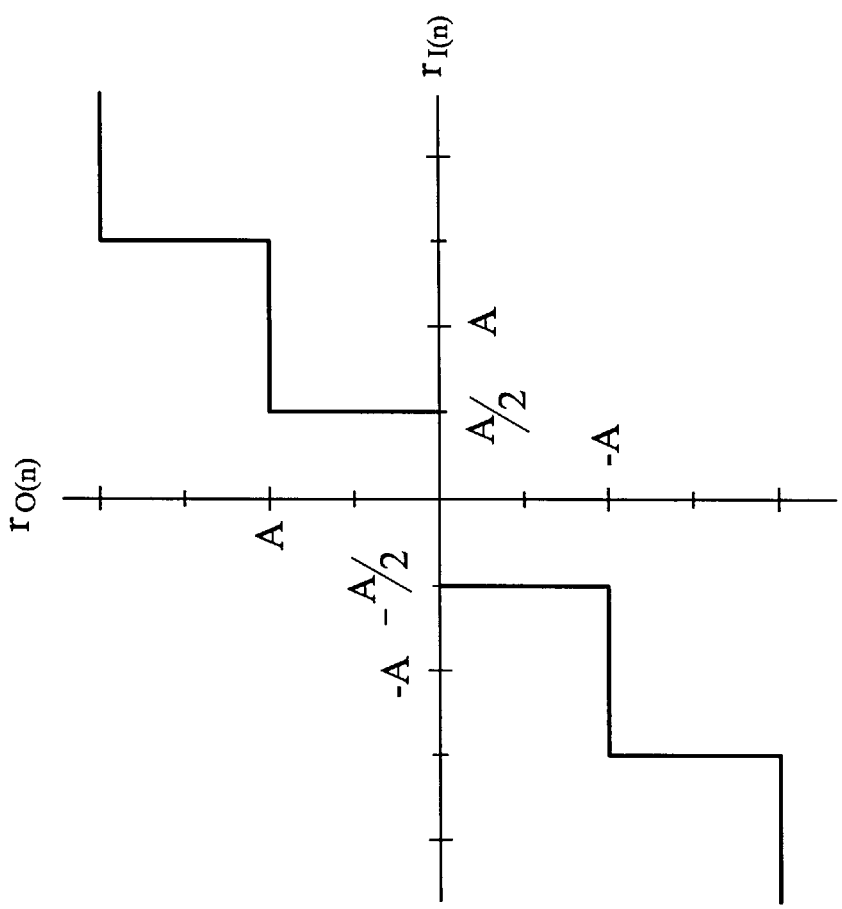
FIG. 6 is a schematic diagram illustrating the relation between an input level of the slicer and an output level of the slicing level in FIG. 3.

FIG. 6 is a schematic diagram illustrating the relation between an input level of the slicer and an output level of the slicing level in the FIG. 3. The cross axis represents the output of the blind equalizer $r_f(n)$, i.e. the input level of the slicer 36. The vertical axle represents the output of the slicer $r_O(n)$. While the input level of the slicer $r_f(n)$ is smaller than the slicing level A/2, the output of the slicer $r_O(n)$ is zero. While the input level of the slicer $r_f(n)$ is larger than the slicing level A/2, the output of the slicer $r_O(n)$ is not zero. In the embodiment of the invention, the primary signal $X_S$ of the input signal Sn after the slicer 36 must not be zero, so amplitudes of the primary signal $X_S$ after the blind equalizer are larger than the slicing level A/2. For removing the interference signal $X_I$, the interference signal $X_I$ of the input signal Sn after the slicer 36 must be zero. Therefore, amplitudes of the interference signal $X_I$ after the blind equalizer are smaller than the slicing level A/2.

To adapt the input signal Sn, the blind equalizer 34 adjusts a plurality of tap weights in the blind equalizer 34. The adjusting step comprises two parts. For the primary signal $X_S$, since the primary signal $X_S$ is the set of continuously decreasing signals and the input signal Sn comprises the primary signal $X_S$, to make amplitude of the primary signal $X_S$ after the blind equalizer 34 larger than the slicing level A/2, the tap weight corresponding to the primary signal $X_S$ in the blind equalizer 34 gradually increases and finally overflows. For the interference signal $X_I$, since the primary signal $X_S$ is the set of continuously decreasing signals, to make amplitudes of the interference signal $X_I$ after the bind equalizer smaller than the slicing level A/2, the tap weights corresponding to the interference signal $X_I$ in the blind equalizer 34 gradually increase and finally overflow.

Moreover, the primary signaling point $t_s$ which produces the primary signal $X_S$ and the interfering signaling points $t_{i1}$ and $t_{i2}$ which produce the interference signal $X_I$ determine tap weights which will overflow in the blind equalizer 34. In other words, choose the primary signaling point and the interfering signaling points to decide the tap weights, which will overflow in the blind equalizer.

Finally, while the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for overflow testing of a blind equalizer, the blind equalizer adapting an input signal by adjusting a plurality of tap weights in the blind equalizer, the method comprising the steps of:

providing a primary located signal in a primary signaling point of a period by a signal generating loop;

multiplying the primary located signal by a set of continuously decreasing signals to get a primary signal;

providing an interfering located signal in a plurality of interfering signaling points of the period by an ISI generating loop, wherein the interfering signaling points are different from the primary signaling point;

multiplying the interfering located signal by a set of continuous signals to get an interference signal;

adding the primary signal and the interference signal to get the input signal; and inputting the input signal to the blind equalizer to adapt the input signal, wherein the tap weights corresponding to the interference signal in the blind equalizer overflow;

wherein an initial status of the ISI generating loop is determined by a slicing level of a slicer, amplitudes of the primary signal after the blind equalizer are larger than the slicing level and amplitudes of the interference signal after the blind equalizer are smaller than the slicing level.

2. The method for overflow test of a blind equalizer as claimed in claim 1, wherein the interference signal comprises a plurality of precursor interfering located signals and a plurality of postcursor interfering located signals.

3. The method for overflow test of a blind equalizer as claimed in claim 1, wherein the continuous signals are a set of continuously decreasing signals.

4. The method for overflow test of a blind equalizer as claimed in claim 1, wherein the continuous signals are a set of continuously increasing signals.

5. The method for overflow test of a blind equalizer as claimed in claim 1, wherein the blind equalize further comprises a learning constant which is bigger than the absolute value of modulus of an primary slope formed by amplitudes of the primary signal.

6. The method for overflow test of a blind equalizer as claimed in claim 1, wherein the blind equalize further comprises a learning constant which is bigger than the absolute value of modulus of an interfering slope formed by amplitudes of the interference signals.

7. The method for overflow test of a blind equalizer as claimed in claim 1, wherein the blind equalize further comprises a plurality of registers and the interval between two signals of the continuous signals and the continuously decreasing signals are bigger than the number of the registers.

8. The method for overflow test of a blind equalizer as claimed in claim 1, wherein adaptive algorithms used in the blind equalizer to adapt the input signal are Least-Mean-Square or Recursive Least Square.

* * * * *